US010377179B2

(12) United States Patent
Sato

(10) Patent No.: US 10,377,179 B2
(45) Date of Patent: Aug. 13, 2019

(54) PNEUMATIC TIRE

(71) Applicant: The Yokohama Rubber Co., LTD., Minato-ku, Tokyo (JP)

(72) Inventor: Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 909 days.

(21) Appl. No.: 14/786,529

(22) PCT Filed: Apr. 22, 2014

(86) PCT No.: PCT/JP2014/061332
§ 371 (c)(1),
(2) Date: Oct. 22, 2015

(87) PCT Pub. No.: WO2014/175286
PCT Pub. Date: Oct. 30, 2014

(65) Prior Publication Data

US 2016/0068018 A1 Mar. 10, 2016

(30) Foreign Application Priority Data

Apr. 23, 2013 (JP) ................................ 2013-090697

(51) Int. Cl.
*B60C 9/18* (2006.01)
*B60C 3/04* (2006.01)
(Continued)

(52) U.S. Cl.
CPC .................. *B60C 3/04* (2013.01); *B60C 9/18* (2013.01); *B60C 9/2006* (2013.01); *B60C 9/28* (2013.01);
(Continued)

(58) Field of Classification Search
CPC .... B60C 3/04; B60C 9/28; B60C 9/18; B60C 9/2006; B60C 2009/2067;
(Continued)

(56) References Cited

U.S. PATENT DOCUMENTS

2014/0373992 A1 12/2014 Ishizaka et al.
2015/0101727 A1 4/2015 Hamanaka

FOREIGN PATENT DOCUMENTS

JP H06-0171309 6/1994
JP 3124851 1/2001
(Continued)

OTHER PUBLICATIONS

Machine translation of JP06-171309 (no date).*
International Search Report for International Application No. PCT/JP2014/061332 dated Jul. 22, 2014, 2 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A pneumatic tire (1), wherein an inter-cord distance (Gcl) between a circumferential reinforcing layer (145) and an inner-side belt ply (142) at a tire equatorial plane (CL), an inter-cord distance (Gcu) between the circumferential reinforcing layer (145) and an outer-side belt ply (143) at the tire equatorial plane (CL), an inter-cord distance (Gsl) between the circumferential reinforcing layer (145) and the inner-side belt ply (142) at end regions of the circumferential reinforcing layer (145), an inter-cord distance (Gsu) between the circumferential reinforcing layer (145) and the outer-side belt ply (143) at the end regions of the circumferential reinforcing layer (145) have a relationship such that 1.20≤(Gcl+Gcu)/(Gsl+Gsu)≤9.20.

13 Claims, 9 Drawing Sheets

(51) Int. Cl.
*B60C 9/28* (2006.01)
*B60C 9/20* (2006.01)

(52) U.S. Cl.
CPC ................. *B60C 2009/1828* (2013.01); *B60C 2009/2067* (2013.01); *B60C 2009/2077* (2013.01); *B60C 2009/2083* (2013.01); *B60C 2009/283* (2013.01); *B60C 2200/06* (2013.01)

(58) Field of Classification Search
CPC .... B60C 2009/2077; B60C 2009/2083; B60C 2009/1828; B60C 2009/283; B60C 2200/06
See application file for complete search history.

(56) References Cited

FOREIGN PATENT DOCUMENTS

| | | |
|---|---|---|
| JP | 5182454 | 4/2013 |
| WO | WO 2013/031021 | 3/2013 |
| WO | WO 2014/010092 | 1/2014 |

* cited by examiner

| | CONVENTIONAL EXAMPLE | COMPARATIVE EXAMPLE 1 | COMPARATIVE EXAMPLE 2 | WORKING EXAMPLE 1 | WORKING EXAMPLE 2 |
|---|---|---|---|---|---|
| Ws/Wca | 0.56 | 0.62 | 0.62 | 0.62 | 0.62 |
| (Gel+ Gcu)/ (Gsl + Gsu) | 1.00 | 1.13 | 9.62 | 1.20 | 1.38 |
| Gcl [mm] | 0.07 | 0.08 | 0.60 | 0.09 | 0.09 |
| Gcu [mm] | 0.08 | 0.09 | 0.65 | 0.09 | 0.09 |
| Gsl [mm] | 0.07 | 0.07 | 0.06 | 0.07 | 0.06 |
| Gsu [mm] | 0.08 | 0.08 | 0.07 | 0.08 | 0.07 |
| Ws/Wb3 | 0.69 | 0.72 | 0.72 | 0.72 | 0.72 |
| Wb2/Wca | 0.73 | 0.73 | 0.73 | 0.73 | 0.73 |
| INNER-SIDE BELT PLY BELT ANGLE [deg] | 14 | 14 | 14 | 14 | 14 |
| OUTER-SIDE BELT PLY BELT ANGLE [deg] | 14 | 14 | 14 | 14 | 14 |
| DIAMETER OF BELT CORDS OF CIRCUMFERENTIAL REINFORCING LAYER [mm] | 1.00 | 1.00 | 1.00 | 1.00 | 1.00 |
| DIAMETER OF BELT CORDS OF INNER-SIDE BELT PLY [mm] | 1.00 | 1.00 | 1.00 | 1.00 | 1.00 |
| DIAMETER OF BELT CORDS OF OUTER-SIDE BELT PLY [mm] | 1.00 | 1.00 | 1.00 | 1.00 | 1.00 |
| NO. OF ENDS OF BELT CORDS IN CIRCUMFERENTIAL REINFORCING LAYER [ends/50 mm] | 16 | 16 | 16 | 16 | 16 |
| NO. OF ENDS OF BELT CORDS IN INNER-SIDE BELT PLY [ends/50 mm] | 16 | 16 | 16 | 16 | 16 |
| NO. OF ENDS OF BELT CORDS IN OUTER-SIDE BELT PLY [ends/50 mm] | 16 | 16 | 16 | 16 | 16 |
| TW/SW | 0.92 | 0.92 | 0.92 | 0.92 | 0.92 |
| TW/Wca | 0.96 | 0.96 | 0.96 | 0.93 | 0.93 |
| UNIFORMITY OF RADIAL GROWTH | 75 | 85 | 106 | 95 | 100 |
| DURABILITY | 100 | 102 | 102 | 103 | 102 |

FIG. 6A

| | WORKING EXAMPLE 3 | WORKING EXAMPLE 4 | WORKING EXAMPLE 5 | WORKING EXAMPLE 6 | WORKING EXAMPLE 7 |
|---|---|---|---|---|---|
| Ws/Wca | 0.59 | 0.62 | 0.62 | 0.62 | 0.65 |
| (Gel+ Gcu)/ (Gsl + Gsu) | 1.38 | 1.38 | 1.38 | 1.38 | 1.38 |
| Gcl [mm] | 0.09 | 0.14 | 0.30 | 0.30 | 0.30 |
| Gcu [mm] | 0.09 | 0.14 | 0.39 | 0.39 | 0.39 |
| Gsl [mm] | 0.06 | 0.10 | 0.20 | 0.20 | 0.20 |
| Gsu [mm] | 0.07 | 0.10 | 0.30 | 0.30 | 0.30 |
| Ws/Wb3 | 0.69 | 0.72 | 0.72 | 0.80 | 0.84 |
| Wb2/Wca | 0.73 | 0.73 | 0.73 | 0.84 | 0.84 |
| INNER-SIDE BELT PLY BELT ANGLE [deg] | 14 | 14 | 14 | 14 | 14 |
| OUTER-SIDE BELT PLY BELT ANGLE [deg] | 14 | 14 | 14 | 14 | 14 |
| DIAMETER OF BELT CORDS OF CIRCUMFERENTIAL REINFORCING LAYER [mm] | 1.00 | 1.00 | 1.00 | 1.00 | 1.00 |
| DIAMETER OF BELT CORDS OF INNER-SIDE BELT PLY [mm] | 1.00 | 1.00 | 1.00 | 1.00 | 1.00 |
| DIAMETER OF BELT CORDS OF OUTER-SIDE BELT PLY [mm] | 1.00 | 1.00 | 1.00 | 1.00 | 1.00 |
| NO. OF ENDS OF BELT CORDS IN CIRCUMFERENTIAL REINFORCING LAYER [ends/50 mm] | 16 | 16 | 16 | 16 | 16 |
| NO. OF ENDS OF BELT CORDS IN INNER-SIDE BELT PLY [ends/50 mm] | 16 | 16 | 16 | 16 | 16 |
| NO. OF ENDS OF BELT CORDS IN OUTER-SIDE BELT PLY [ends/50 mm] | 16 | 16 | 16 | 16 | 16 |
| TW/SW | 0.92 | 0.92 | 0.92 | 0.92 | 0.92 |
| TW/Wca | 0.93 | 0.93 | 0.93 | 0.93 | 0.93 |
| UNIFORMITY OF RADIAL GROWTH | 95 | 100 | 100 | 100 | 100 |
| DURABILITY | 101 | 104 | 108 | 110 | 112 |

FIG. 6B

| | WORKING EXAMPLE 8 | WORKING EXAMPLE 9 | WORKING EXAMPLE 10 | WORKING EXAMPLE 11 |
|---|---|---|---|---|
| Ws/Wca | 0.65 | 0.65 | 0.65 | 0.65 |
| (Gcl+ Gcu)/(Gsl + Gsu) | 1.38 | 1.38 | 1.38 | 1.38 |
| Gcl [mm] | 0.30 | 0.30 | 0.30 | 0.30 |
| Gcu [mm] | 0.39 | 0.39 | 0.39 | 0.39 |
| Gsl [mm] | 0.20 | 0.20 | 0.20 | 0.20 |
| Gsu [mm] | 0.30 | 0.30 | 0.30 | 0.30 |
| Ws/Wb3 | 0.84 | 0.84 | 0.84 | 0.84 |
| Wb2/Wca | 0.84 | 0.84 | 0.84 | 0.84 |
| INNER-SIDE BELT PLY BELT ANGLE [deg] | 17 | 58 | 17 | 17 |
| OUTER-SIDE BELT PLY BELT ANGLE [deg] | 17 | 58 | 17 | 17 |
| DIAMETER OF BELT CORDS OF CIRCUMFERENTIAL REINFORCING LAYER [mm] | 1.00 | 1.00 | 1.70 | 1.70 |
| DIAMETER OF BELT CORDS OF INNER-SIDE BELT PLY [mm] | 1.00 | 1.00 | 1.20 | 1.40 |
| DIAMETER OF BELT CORDS OF OUTER-SIDE BELT PLY [mm] | 1.00 | 1.00 | 1.20 | 1.40 |
| NO. OF ENDS OF BELT CORDS IN CIRCUMFERENTIAL REINFORCING LAYER [ends/50 mm] | 16 | 16 | 16 | 16 |
| NO. OF ENDS OF BELT CORDS IN INNER-SIDE BELT PLY [ends/50 mm] | 16 | 16 | 16 | 16 |
| NO. OF ENDS OF BELT CORDS IN OUTER-SIDE BELT PLY [ends/50 mm] | 16 | 16 | 16 | 16 |
| TW/SW | 0.92 | 0.92 | 0.92 | 0.92 |
| TW/Wca | 0.93 | 0.93 | 0.93 | 0.93 |
| | | | | |
| UNIFORMITY OF RADIAL GROWTH | 100 | 100 | 100 | 100 |
| DURABILITY | 110 | 102 | 113 | 116 |

FIG. 7A

| | WORKING EXAMPLE 12 | WORKING EXAMPLE 13 | WORKING EXAMPLE 14 | WORKING EXAMPLE 15 |
|---|---|---|---|---|
| Ws/Wca | 0.65 | 0.65 | 0.65 | 0.65 |
| (Gcl+ Gcu)/(Gsl + Gsu) | 1.38 | 1.38 | 1.38 | 1.38 |
| Gcl [mm] | 0.30 | 0.30 | 0.30 | 0.30 |
| Gcu [mm] | 0.39 | 0.39 | 0.39 | 0.39 |
| Gsl [mm] | 0.20 | 0.20 | 0.20 | 0.20 |
| Gsu [mm] | 0.30 | 0.30 | 0.30 | 0.30 |
| Ws/Wb3 | 0.84 | 0.84 | 0.84 | 0.84 |
| Wb2/Wca | 0.84 | 0.84 | 0.84 | 0.84 |
| INNER-SIDE BELT PLY BELT ANGLE [deg] | 17 | 17 | 17 | 17 |
| OUTER-SIDE BELT PLY BELT ANGLE [deg] | 17 | 17 | 17 | 17 |
| DIAMETER OF BELT CORDS OF CIRCUMFERENTIAL REINFORCING LAYER [mm] | 1.70 | 1.70 | 1.70 | 1.70 |
| DIAMETER OF BELT CORDS OF INNER-SIDE BELT PLY [mm] | 1.40 | 1.40 | 1.40 | 1.40 |
| DIAMETER OF BELT CORDS OF OUTER-SIDE BELT PLY [mm] | 1.40 | 1.40 | 1.40 | 1.40 |
| NO. OF ENDS OF BELT CORDS IN CIRCUMFERENTIAL REINFORCING LAYER [ends/50 mm] | 18 | 23 | 23 | 23 |
| NO. OF ENDS OF BELT CORDS IN INNER-SIDE BELT PLY [ends/50 mm] | 18 | 23 | 23 | 23 |
| NO. OF ENDS OF BELT CORDS IN OUTER-SIDE BELT PLY [ends/50 mm] | 18 | 23 | 23 | 23 |
| TW/SW | 0.92 | 0.92 | 0.87 | 0.87 |
| TW/Wca | 0.93 | 0.93 | 0.93 | 0.91 |
| | | | | |
| UNIFORMITY OF RADIAL GROWTH | 100 | 100 | 100 | 100 |
| DURABILITY | 119 | 121 | 122 | 123 |

FIG. 7B

PNEUMATIC TIRE

TECHNICAL FIELD

The present technology relates to a pneumatic tire, and particularly relates to a pneumatic tire with enhanced uniformity of radial growth.

BACKGROUND

With a conventional pneumatic tire, achieving uniform radial growth between the center region and the shoulder regions of the tread portion when the pneumatic tire is inflated is an issue faced in order to appropriately adjust the ground contact shape of the tire. A conventional pneumatic tire, i.e. known technology, that addresses this issue is described in Japanese Patent No. 3124851.

SUMMARY

The present technology provides a pneumatic tire whereby uniformity of radial growth is enhanced.

A pneumatic tire according to the present technology includes: a carcass layer; a belt layer disposed on an outer side in a tire radial direction of the carcass layer; and a tread rubber disposed on an outer side in the tire radial direction of the belt layer. The belt layer includes a circumferential reinforcing layer having a belt angle within the range of ±5° with respect to a tire circumferential direction, and an inner-side belt ply and an outer-side belt ply having a belt angle, as an absolute value, of not less than 10° and not more than 70°, laminated adjacent to the circumferential reinforcing layer on an inner side in the tire radial direction and the outer side in the tire radial direction of the circumferential reinforcing layer respectively. An inter-cord distance Gcl between the circumferential reinforcing layer and the inner-side belt ply at a tire equatorial plane, an inter-cord distance Gcu between the circumferential reinforcing layer and the outer-side belt ply at the tire equatorial plane, an inter-cord distance Gsl between the circumferential reinforcing layer and the inner-side belt ply at end regions of the circumferential reinforcing layer, and an inter-cord distance Gsu between the circumferential reinforcing layer and the outer-side belt ply at the end regions of the circumferential reinforcing layer have a relationship such that $1.20 \le (Gcl+Gcu)/(Gsl+Gsu) \le 9.20$.

In the pneumatic tire according to the present technology, a sum (Gcl+Gcu) of the inter-cord distances on the inside and outside of the circumferential reinforcing layer at the tire equatorial plane is set larger than a sum (Gsl+Gsu) of the inter-cord distances on the inside and outside of the circumferential reinforcing layer at the end regions of the circumferential reinforcing layer. Therefore the shear stress acting between the belt plies when the tire is rolling is relatively reduced at the tire equatorial plane, and relatively increased at the end regions of the circumferential reinforcing layer. As a result the difference in radial growth of the tread portion between the center region and the end regions of the circumferential reinforcing layer is made uniform, which has the advantage that the uniformity of radial growth of the tire is increased.

BRIEF DESCRIPTION OF DRAWING(S)

FIGS. 6A-6B include a table showing results of performance testing of pneumatic tires according to embodiments of the present technology.

FIGS. 7A-7B include a table showing results of performance testing of pneumatic tires according to embodiments of the present technology.

DETAILED DESCRIPTION

The present technology is described in detail below, with reference to the accompanying drawings. Note that the present technology is not limited to the embodiments. Additionally, components which can possibly or obviously be substituted while maintaining consistency with the present technology are included in components of the embodiments. Additionally, a plurality of modified examples that are described in the embodiments can be freely combined within the scope of obviousness for a person skilled in the art.

Pneumatic Tire

Figure 1:
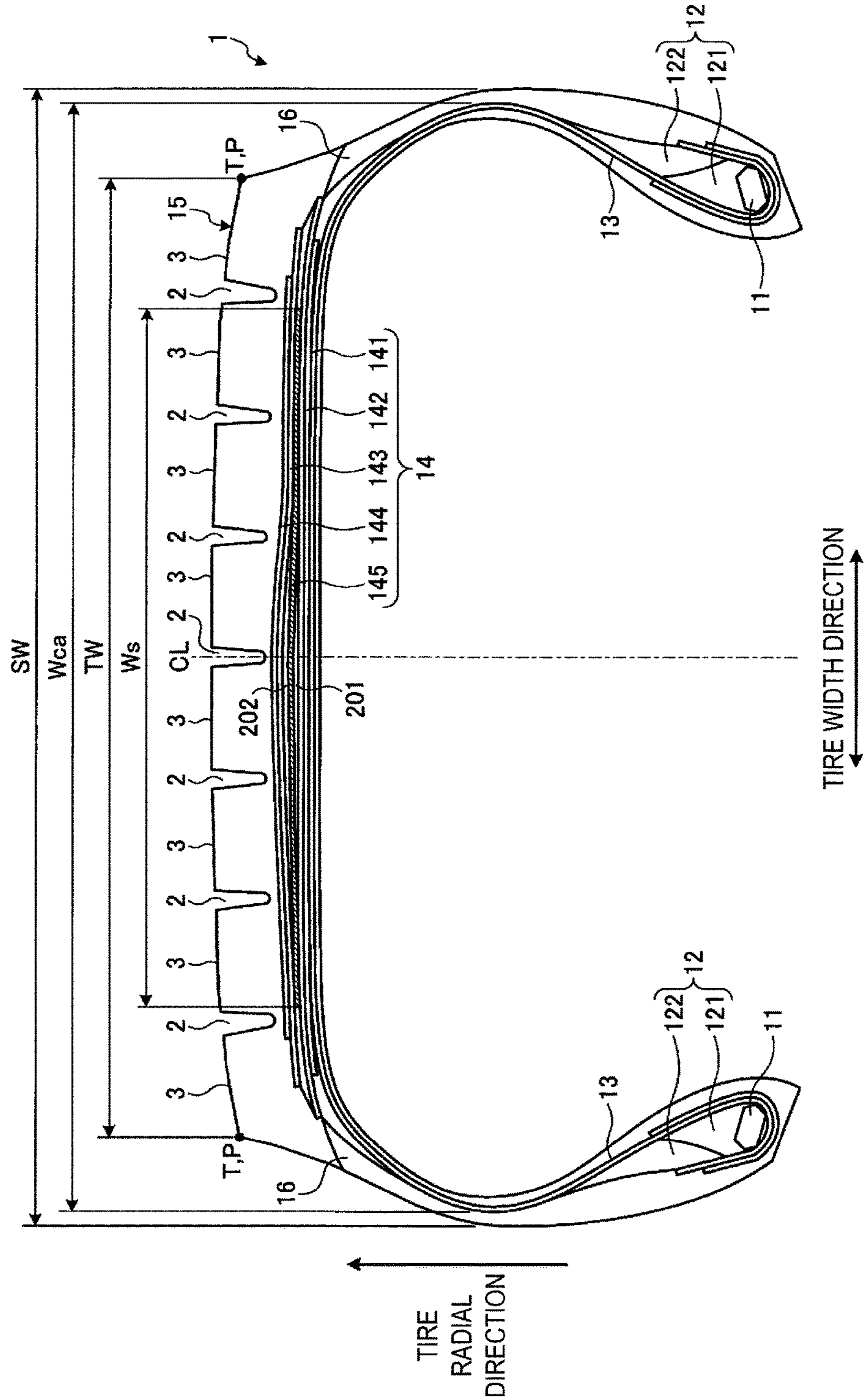
FIG. 1 is a cross-sectional view from the tire meridian direction illustrating a pneumatic tire according to an embodiment of the present technology.

FIG. 1 is a cross-sectional view from the tire meridian direction illustrating a pneumatic tire according to an embodiment of the present technology. The drawing illustrates a radial tire for heavy loads that is mounted on trucks, buses, and the like for long-distance transport as an example of a pneumatic tire 1. Note that the reference sign CL refers to a tire equatorial plane. Additionally, a tread edge P and a tire ground contact edge T coincide with each other in FIG. 1. Additionally, a circumferential reinforcing layer 145 in FIG. 1 is indicated by hatching.

The pneumatic tire 1 includes a pair of bead cores 11, 11, a pair of bead fillers 12, 12, a carcass layer 13, a belt layer 14, a tread rubber 15, and a pair of sidewall rubbers 16, 16 (see FIG. 1).

The pair of bead cores 11, 11 have annular structures and configure cores of left and right bead portions. The pair of bead fillers 12, 12 are formed from a lower filler 121 and an upper filler 122, and are disposed on an outer circumference of the pair of bead cores 11, 11 in the tire radial direction so as to reinforce the bead portions.

The carcass layer 13 extends between the left and right side bead cores 11, 11 in a toroidal form, forming a framework for the tire. Additionally, both ends of the carcass layer 13 are folded from an inner side in the tire width direction toward an outer side in the tire width direction and fixed so as to wrap around the bead cores 11 and the bead fillers 12. Also, the carcass layer 13 is constituted from a plurality of carcass cords formed from steel or organic fiber material (e.g. nylon, polyester, rayon, or the like) covered by a coating rubber and subjected to a rolling process, and has a carcass angle (inclination angle of the fiber direction of the carcass cord with respect to the tire circumferential direction), as an absolute value, of not less than 85° and not more than 95°.

The belt layer 14 is formed by laminating a plurality of belt plies 141 to 145, and disposed wound over a periphery of the carcass layer 13. The specific configuration of the belt layer 14 is described below.

The tread rubber 15 is disposed to the periphery in the tire radial direction of the carcass layer 13 and the belt layer 14, and forms a tread portion of the tire. The pair of sidewall rubbers 16, 16 is disposed on each outer side of the carcass layer 13 in the tire width direction, so as to form left and right sidewall portions of the tire.

In the configuration illustrated in FIG. 1, the pneumatic tire 1 includes seven circumferential main grooves 2 that extend in a tire circumferential direction, and eight land portions 3 partitioned by the circumferential main grooves 2. The land portions 3 are formed of blocks that are segmented in the tire circumferential direction by lug grooves (not illustrated) or formed of ribs that continue in the tire circumferential direction.

Here, "circumferential main grooves" refers to circumferential grooves having a groove width of not less than 5.0 mm. The groove width of the circumferential main grooves is measured excluding notched portions and/or chamfered portions formed at the groove opening portion.

Additionally, in the pneumatic tire 1, the left and right circumferential main grooves 2, 2 located furthest out in the tire width direction are referred to as outermost circumferential main grooves. Moreover, the left and right land portions 3, 3 located outward in the tire width direction that are defined by the left and right outermost circumferential main grooves 2, 2 are referred to as shoulder land portions.

Belt Layer

Figure 2:
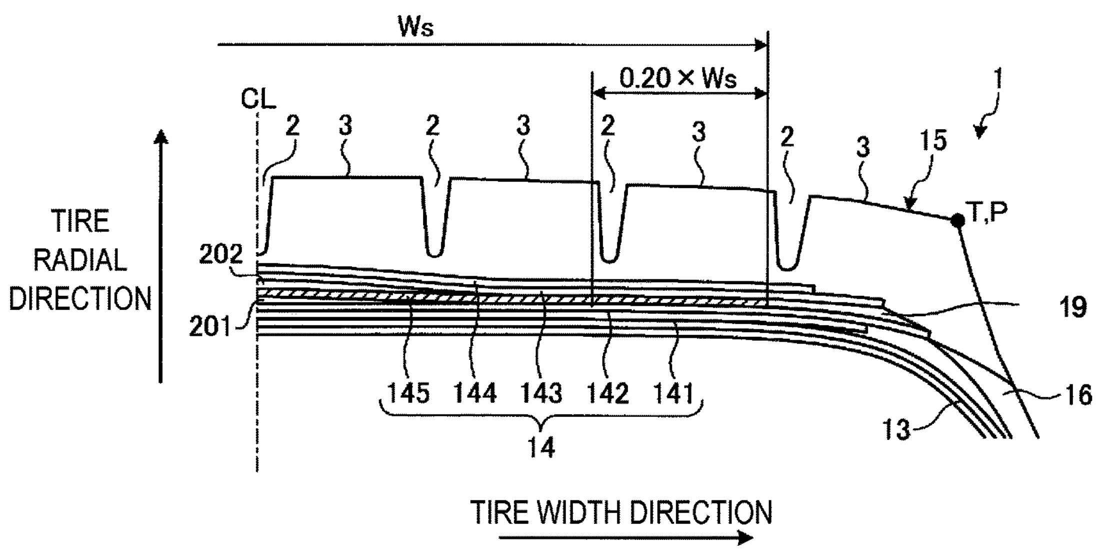
FIG. 2 is an explanatory view illustrating the belt layer of the pneumatic tire illustrated in FIG. 1.
Figure 3:
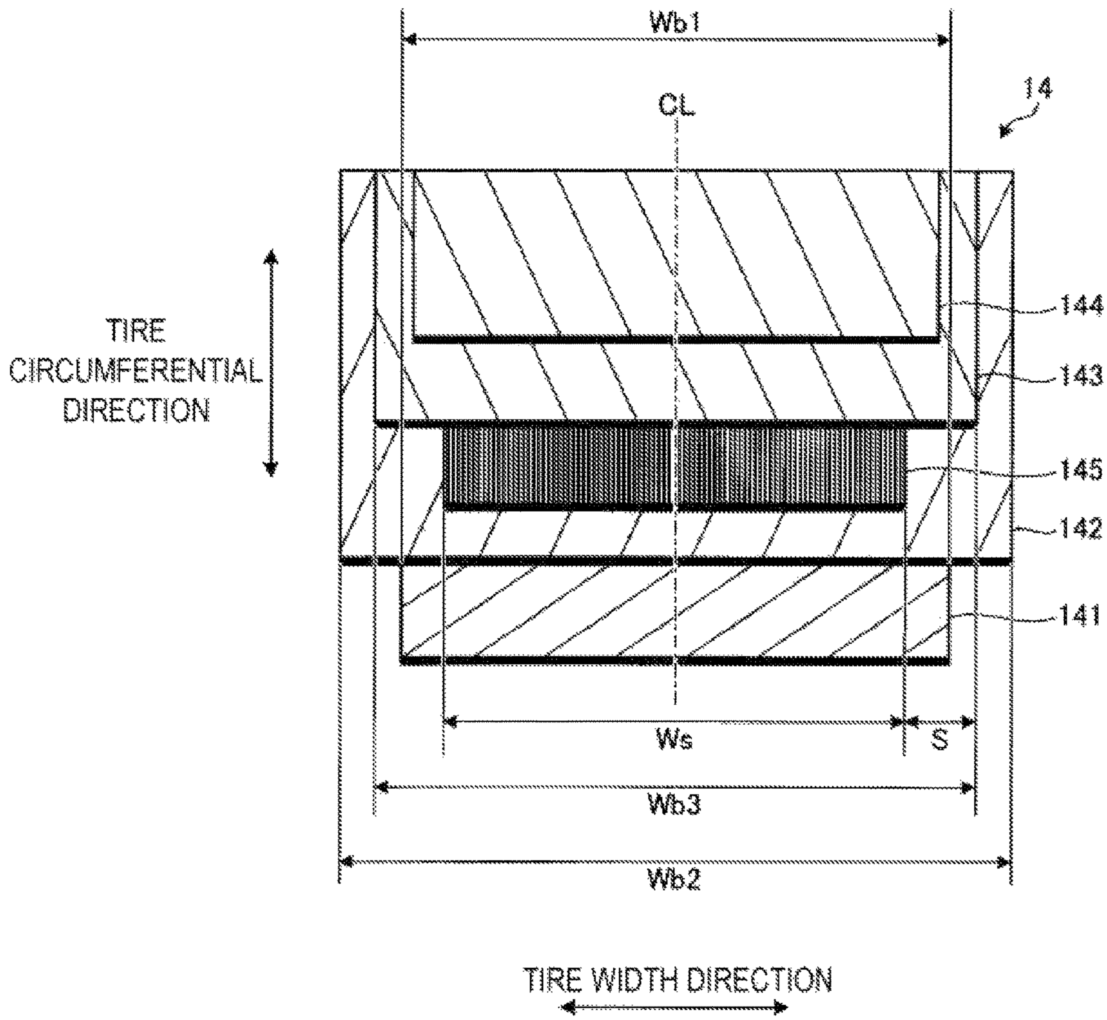
FIG. 3 is an explanatory view illustrating the belt layer of the pneumatic tire illustrated in FIG. 1.

FIGS. 2 and 3 are explanatory views illustrating a belt layer of the pneumatic tire illustrated in FIG. 1. Among these drawings, FIG. 2 illustrates an area on one side of a tread portion demarcated by the tire equatorial plane CL, and FIG. 3 illustrates a layered structure of the belt layer 14. Note that, the thin lines in the belt plies 141 to 145 in FIG. 3 schematically represent the respective belt cords of the belt plies 141 to 145.

The belt layer 14 is formed by laminating a large-angle belt 141, a pair of cross belts 142, 143, a belt cover 144, and a circumferential reinforcing layer 145, and is disposed wound over the periphery of the carcass layer 13 (see FIG. 2).

The large-angle belt 141 is configured by a plurality of belt cords formed from steel or organic fiber material, covered by coating rubber, and subjected to a rolling process, having a belt angle (angle of inclination of the fiber direction of the belt cords with respect to the tire circumferential direction), as an absolute value, of not less than 45° and not more than 70°. Additionally, the large-angle belt 141 is disposed layered on the outer side of the carcass layer 13 in the tire radial direction.

The pair of cross belts 142, 143 are configured by a plurality of belt cords formed from steel or organic fiber material, covered by coating rubber, and subjected to a rolling process, having a belt angle, as an absolute value, of not less than 10° and not more than 45°. Additionally, the pair of cross belts 142, 143 have belt angles that are of mutually opposite signs to each other, and are laminated so that the fiber direction of the respective belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Note that three or more cross belts may be disposed so as to be layered (not illustrated). Furthermore, in the present embodiment, the pair of cross belts 142, 143 is disposed laminated on the outer side of the large-angle belt 141 in the tire radial direction.

Also, the belt cover 144 is configured by a plurality of belt cords formed from steel or organic fiber material, covered by coating rubber, and subjected to a rolling process, having a belt angle, as an absolute value, of not less than 10° and not more than 45°. Furthermore, the belt cover 144 is disposed laminated on the outer side of the pair of cross belts 142, 143 in the tire radial direction. Note that, in the present embodiment, the belt cover 144 has the same belt angle as the outer-side cross belt 143, and, additionally, is disposed in the outermost layer of the belt layer 14.

The circumferential reinforcing layer 145 is constituted by coating rubber covered steel belt cords that are wound in a spiral manner with an inclination within a range of ±5° with respect to the tire circumferential direction. Furthermore, in the present embodiment, the circumferential reinforcing layer 145 is disposed interposed between the pair of cross belts 142, 143. Additionally, the circumferential reinforcing layer 145 is disposed inward in the tire width direction from the left and right edge portion of the pair of cross belts 142, 143. Specifically, the circumferential reinforcing layer 145 is formed by winding one or a plurality of wires in a spiral manner around the outer circumference of the inner-side cross belt 142. This circumferential reinforcing layer 145 reinforces the stiffness in the tire circumferential direction. As a result, the tire durability is improved.

Here, in the pneumatic tire 1, the belt layer 14 may have an edge cover (not illustrated). Generally, the edge cover is configured by a plurality of belt cords formed from steel or organic fiber material covered by coating rubber and subjected to a rolling process, having a belt angle, as an absolute value, of not less than 0° and not more than 5°. Additionally, edge covers are disposed on the outer side in the tire radial direction of the left and right edge portion of the outer-side cross belt 143 (or the inner-side cross belt 142). The difference in radial growth between the center region and the shoulder region of the tread portion is reduced, so as to improve uneven wear resistance of the tire due to a hoop effect demonstrated by the edge covers.

Improvement in Uniformity of Radial Growth

In recent years, heavy duty tires mounted on trucks, buses, and the like maintain the shape of the tread portion due to the tires having a low aspect ratio while having a circumferential reinforcing layer disposed in a belt layer. Specifically, by disposing the circumferential reinforcing layer at the center region of the tread portion, and utilizing the hoop effect, radial growth of the tread is suppressed and the shape of the tread portion is maintained.

However, in the configuration as described above, there is the problem that a difference in radial growth occurs in the tread portion between the center portion and the two end portions in the region where the circumferential reinforcing layer is disposed.

Thus, this pneumatic tire 1 uses the following configuration in order to achieve uniformity of radial growth of the tread portion (see FIGS. 1 to 3).

Figure 4:
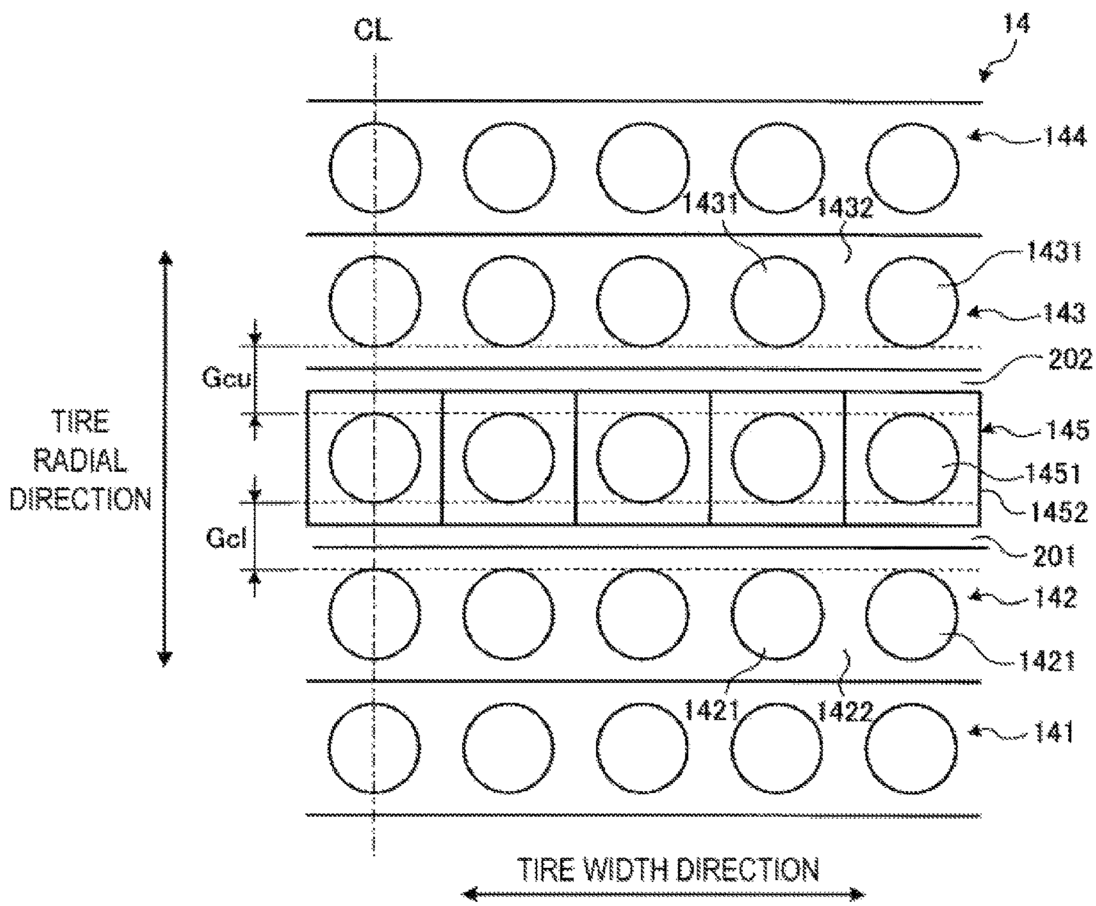
FIG. 4 is an explanatory view illustrating the belt layer of the pneumatic tire illustrated in FIG. 1.
Figure 5:
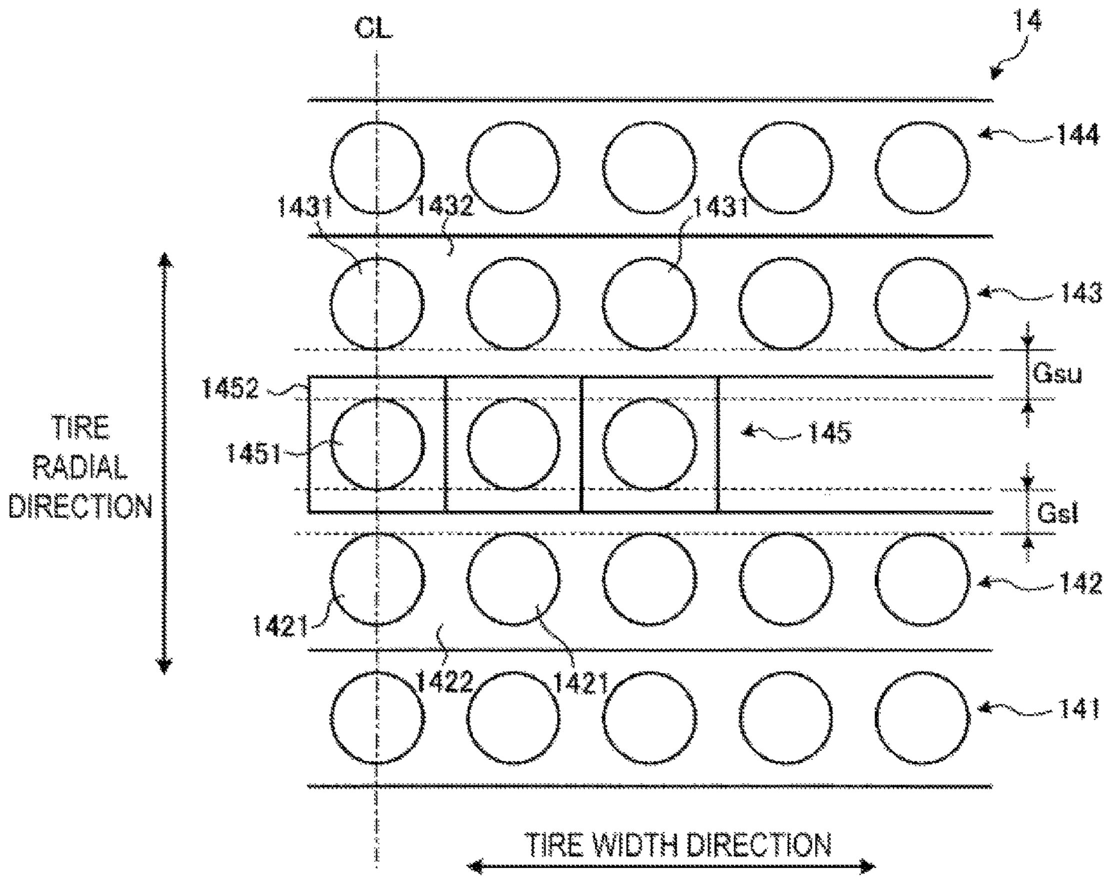
FIG. 5 is an explanatory view illustrating the belt layer of the pneumatic tire illustrated in FIG. 1.

FIGS. 4 and 5 are explanatory views illustrating a belt layer of the pneumatic tire illustrated in FIG. 1. Among these drawings, FIG. 4 illustrates the laminated structure of the belt plies 141 to 145 at the tire equatorial plane CL, and FIG. 5 illustrates the laminated structure of the belt plies 141 to 145 at the end portions of the circumferential reinforcing layer 145.

First, the belt ply laminated on the inner side in the tire radial direction of the circumferential reinforcing layer 145 and adjacent to the circumferential reinforcing layer 145 is referred to as the inner-side belt ply (in FIG. 2, the inner-side cross belt 142). Also, the belt ply laminated on the outer side in the tire radial direction of the circumferential reinforcing layer 145 and adjacent to the circumferential reinforcing layer 145 is referred to as the outer-side belt ply (in FIG. 2, the outer-side cross belt 143). Also, the inner-side belt ply and the outer-side belt ply have a belt angle, as an absolute value, of not less than 10° and not greater than 70°.

For example, in the configuration in FIG. 2, the circumferential reinforcing layer 145 is disposed interposed between the pair of cross belts 142, 143. Therefore the inner-side cross belt 142 corresponds to the inner-side belt ply, and the outer-side cross belt 143 corresponds to the outer-side belt ply. Also, the inner-side belt ply and the outer-side belt ply have a belt angle, as an absolute value, of not less than 10° and not more than 45°, with mutually opposite signs.

However, the circumferential reinforcing layer 145 is not limited as such, and may also be disposed on the outer side in the tire radial direction of the pair of cross belts 142, 143 (not illustrated). Additionally, the circumferential reinforcing layer 145 may also be disposed on the inner side of the pair of cross belts 142, 143, in other words, disposed between the large-angle belt 141 and the inner-side cross belt 142 (not illustrated). In these cases also, the inner-side belt ply and the outer-side belt ply are defined in accordance with their respective positional relationship with the circumferential reinforcing layer 145 as described above.

Next, the inter-cord distance Gcl between the circumferential reinforcing layer 145 and the inner-side belt ply at the tire equatorial plane CL, and the inter-cord distance Gcu between the circumferential reinforcing layer 145 and the outer-side belt ply at the tire equatorial plane CL are defined as illustrated in FIG. 4. Also, the inter-cord distance Gsl between the circumferential reinforcing layer 145 and the inner-side belt ply at the end regions of the circumferential reinforcing layer 145, and the inter-cord distance Gsu between the circumferential reinforcing layer and the outer-side belt ply 143 at the end regions of the circumferential reinforcing layer 145 are defined as illustrated in FIG. 5.

The inter-cord distances Gcl, Gcu, Gsl, Gsu are the thicknesses of the rubber material between the belt cords of the adjacent belt plies, and are measured with the tire mounted on a specified rim and inflated with the specified inner pressure under no load conditions. Specifically, for example, a single tire is applied to the imaginary line of a tire profile measured by a laser profiler and fixed with tape or the like. Next, the distance in the tire radial direction between the lower end position of the belt cord of the belt ply on the inner side in the tire radial direction and the upper end position of the belt cord of the belt ply on the outer side in the tire radial direction of the adjacent belt plies to be measured is measured using calipers or the like, and the value is taken to be the inter-cord distance. The laser profiler used can be, for example, a tire profile measuring device (manufactured by Matsuo Co., Ltd.).

Also, the end region of the circumferential reinforcing layer 145 refers to the region from the end on the outer side in the tire width direction of the circumferential reinforcing layer 145 to a position 20% of the width Ws of the circumferential reinforcing layer 145 from the end, and is defined on both the left and right ends of the circumferential reinforcing layer 145.

The width Ws of the circumferential reinforcing layer 145 is the distance from the left to the right end portions of the circumferential reinforcing layer 145 in the direction of the tire rotational axis measured when the tire is mounted on a specified rim, inflated to a specified internal pressure, and is in an unloaded state.

At this time, the inter-cord distances Gcl, Gcu, Gsl, Gsu between the circumferential reinforcing layer 145 and the inner-side belt ply 142 and the outer-side belt ply 143 have the relationship $1.20 \leq (Gcl+Gcu)/(Gsl+Gsu) \leq 9.20$ (see FIGS. 4 and 5). In other words, the sum of the inter-cord distances (Gcl+Gcu) between the circumferential reinforcing layer 145 and the inner-side belt ply 142 and the outer-side belt ply 143 at the tire equatorial plane CL is set larger than the sum of the inter-cord distances (Gsl+Gsu) between the circumferential reinforcing layer 145 and the inner-side belt ply 142 and the outer-side belt ply 143 at the end regions of the circumferential reinforcing layer 145.

For example, in the configuration in FIG. 2, the circumferential reinforcing layer 145 is disposed interposed between the pair of cross belts 142, 143, as described above. Therefore the inner-side cross belt 142 corresponds to the inner-side belt ply, and the outer-side cross belt 143 corresponds to the outer-side belt ply. Also, as illustrated in FIGS. 4 and 5, the pair of cross belts 142, 143 is configured from a plurality of belt cords 1421, 1431 covered with coating rubber 1422, 1432, subjected to a rolling process. Also, the circumferential reinforcing layer 145 is configured by belt cords 1451 covered with coating rubber 1452 that are wound in a spiral manner with respect to the tire circumferential direction.

Also, intermediate rubber 201, 202 is disposed interposed between the circumferential reinforcing layer 145 and the inner-side belt ply 142 and between the circumferential reinforcing layer 145 and the outer-side belt ply 143 respectively. Also, the intermediate rubber 201, 202 is configured from the same rubber material as the coating rubber 1452, 1422, 1432 of the circumferential reinforcing layer 145, the inner-side belt ply 142, and the outer-side belt ply 143. Also, the intermediate rubber 201, 202 has a width that is narrower than the width Ws of the circumferential reinforcing layer 145, and is disposed in the center region in the tire width direction of the circumferential reinforcing layer 145. Also, the intermediate rubber 201, 202 has a thin circular arc shape in a cross-sectional view in the tire meridian direction, having a maximum gauge at the tire equatorial plane CL, with the gauge reducing towards the outer side in the tire width direction. Therefore, as illustrated in FIG. 4, in the central region of the circumferential reinforcing layer 145 that includes the tire equatorial plane CL, the sum of the inter-cord distances (Gcl+Gcu) between the circumferential reinforcing layer 145 and the inner-side belt ply 142 and the outer-side belt ply 143 is increased by the intermediate rubber 201, 202. Also, as illustrated in FIG. 5, in the end regions of the circumferential reinforcing layer 145, the sum of the inter-cord distances (Gsl+Gsu) between the circumferential reinforcing layer 145 and the inner-side belt ply 142 and the outer-side belt ply 143 is narrower.

Also, as illustrated in FIG. 2, the sum of the inter-cord distances on the inside and outside of the circumferential reinforcing layer 145 monotonically becomes less from the tire equatorial plane CL towards the end regions of the circumferential reinforcing layer 145. In addition, as illustrated in FIG. 5, in the end regions of the circumferential reinforcing layer 145 (the regions with 20% the width of the width Ws of the circumferential reinforcing layer 145), the sum of the inter-cord distances (Gsl+Gsu) monotonically becomes less towards the outer side in the tire width direction (constant or reducing).

In the configuration as described above, the sum of the inter-cord distances (Gcl+Gcu) on the inside and outside of the circumferential reinforcing layer 145 at the tire equatorial plane CL is set larger than the sum of the inter-cord distances (Gsl+Gsu) on the inside and outside of the circumferential reinforcing layer 145 at the end regions of the circumferential reinforcing layer 145. Therefore, the shear stress acting between the belt plies 142, 143, 145 when the tire is rolling is relatively smaller at the tire equatorial plane CL, and is relatively larger at the end regions of the circumferential reinforcing layer 145. As a result, the difference in radial growth of the tread portion between the center region and the end regions of the circumferential reinforcing layer 145 becomes uniform, and the uniformity of radial growth of the tire is improved.

Note that in the configurations of FIGS. 2, 4, and 5, the inter-cord distances Gcl, Gcu, Gsl, Gsu have the relationships Gsl<Gcl and Gsu<Gcu. In other words, both the inter-cord distances Gcl, Gsl between the circumferential reinforcing layer 145 and the inner-side belt ply 142 and the inter-cord distances Gcu, Gsu between the circumferential reinforcing layer 145 and the outer-side belt ply 143 have gauge differences between the tire equatorial plane CL and the end regions of the circumferential reinforcing layer 145. As a result, the difference in radial growth of the tread portion between the center region and the end regions of the circumferential reinforcing layer 145 is effectively made uniform.

However, this is not a limitation, and it is sufficient if the inter-cord distances Gcl, Gcu, Gsl, Gsu satisfy the conditions of one of Gsl<Gcl and Gsu<Gcu (not illustrated). In other words, either the inter-cord distances Gcl, Gsl between the circumferential reinforcing layer 145 and the inner-side belt ply 142 only, or the inter-cord distances Gcu, Gsu between the circumferential reinforcing layer 145 and the outer-side belt ply 143 only may have a gauge difference between the tire equatorial plane CL and the end regions of the circumferential reinforcing layer 145. For example, the inter-cord distances Gcl, Gsl between the circumferential reinforcing layer 145 and the inner-side belt ply 142 may have the relationship Gsl<Gcl, and the inter-cord distances Gcu, Gsu of the circumferential reinforcing layer 145 and the outer-side belt ply 143 may be set uniform across the whole region of the circumferential reinforcing layer and have the relationship Gsu=Gcu.

Also, in the configuration as described above, the inter-cord distances Gcl, Gcu, Gsl, Gsu are each preferably not less than 0.10 mm. There is no particular limitation on the upper limit of the inter-cord distances Gcl, Gcu, Gsl, Gsu, but they are restricted by the tire specification or the relationship to the groove bottom gauge of the circumferential main grooves 2.

Also, in the configuration of FIG. 1, the intermediate rubber 201, 202 is used to adjust the inter-cord distances Gcl, Gcu, Gsl, Gsu between the circumferential reinforcing layer 145 and the inner-side belt ply 142 and the outer-side belt ply 143. In this configuration, the existing circumferential reinforcing layer 145, inner-side belt ply 142, and outer-side belt ply 143 having a constant gauge can be adopted, and this is desirable.

However, this is not a limitation, and the inter-cord distances Gcl, Gcu, Gsl, Gsu may be adjusted by adjusting the gauge of the coating rubber 1452 of the circumferential reinforcing layer 145, the coating rubber 1422 of the inner-side belt ply 142, or the coating rubber 1432 of the outer-side belt ply 143. For example, if the coating rubber 1422 of the inner-side belt ply 142 or the coating over 1432 of the outer-side belt ply 143 has a large gauge at the tire equatorial plane CL, by reducing the gauge towards the outer side in the tire width direction, the inter-cord distances Gcl, Gcu, Gsl, Gsu can be adjusted. As a result, the intermediate rubber 201, 202 can be omitted.

[Additional Data]

Additionally, in the pneumatic tire 1, in FIG. 1, the tread width TW and the width Ws of the circumferential reinforcing layer 145 preferably have a relationship such that $0.70 \leq Ws/TW \leq 0.90$.

The tread width TW is the distance in the direction of the tire rotational axis between the left and right tread ends P, P, measured when the tire is mounted on a specified rim, inflated to the specified internal pressure, and is in an unloaded state.

Note that, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer and the tread width TW described above is defined with widths converted to half width with reference the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set with the relationship such that $0.70 \leq Ws'/TW' \leq 0.90$.

Furthermore, as illustrated in FIG. 1, the tread width TW and a total tire width SW have a relationship such that $0.79 \leq TW/SW \leq 0.89$.

The total tire width SW refers to a linear distance (including all portions such as letters and patterns on the tire side surface) from the sidewall to sidewall when the tire is mounted on a specified rim, inflated to the specified internal pressure, and is in an unloaded state.

Furthermore, in FIGS. 1 and 3, a width Wb2 of the wider cross belt 142 and the cross-sectional width Wca of the carcass layer 13 preferably have a relationship such that $0.74 \leq Wb2/Wca \leq 0.89$ and more preferably have a relationship such that $0.78 \leq Wb2/Wca \leq 0.83$.

Preferably, the width Ws of the circumferential reinforcing layer 145 and the cross-sectional width Wca of the carcass layer 13 have a relationship such that $0.60 \leq Ws/Wca \leq 0.70$.

Furthermore, the tread width TW and the cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a specified rim, inflated to the specified internal pressure, and is in an unloaded state.

Also, in FIG. 3, preferably, a width Wb3 of the narrower cross belt 143 and the width Ws of the circumferential reinforcing layer 145 have a relationship such that $0.75 \leq Ws/Wb3 \leq 0.90$. As a result, the width Ws of the circumferential reinforcing layer 145 can be properly secured.

Additionally, as illustrated in FIGS. 2 and 3, the circumferential reinforcing layer 145 is disposed inward of the left and right edge portions of the narrower cross belt 143 of the pair of cross belts 142, 143 in the tire width direction. At this time, the width Wb3 of the narrower cross belt 143 and the distance S from the edge portion of the circumferential reinforcing layer 145 to the edge portion of the narrower cross belt 143 is preferably within a range $0.03 \leq S/Wb3 \leq 0.12$. Thereby, a suitable distance between the edges of the width Wb3 of the cross belt 143 and the edges of the circumferential reinforcing layer 145 is ensured.

The distance S of the circumferential reinforcing layer 145 is measured as a distance in the tire width direction when the tire is mounted on a specified rim, inflated to the specified internal pressure, and is in an unloaded state.

Furthermore, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be constituted by a plurality of wires wound in a spiral manner around side-by-side to each other (multiple winding structure). In this case, preferably, the number of wires is not more than 5. Additionally, the width of winding per unit when five wires are wound in a multiple winding manner is preferably not more than 12 mm. As a result, a plurality of wires (not less than 2 and not more than 5 wires) can be wound properly at an inclination within a range of ±5° with respect to the tire circumferential direction.

Furthermore, in the pneumatic tire 1, the width Wb1 of the large-angle belt 141 and the width Wb3 of the narrower cross belt 143 of the pair of cross belts 142, 143 preferably have a relationship such that 0.85≤Wb1/Wb3≤1.05 (see FIG. 3). Thereby, the ratio Wb1/Wb3 is made appropriate.

The width Wb1 of the large-angle belt 141 and the width Wb3 of the cross belt 143 are measured as the distance in the tire width direction when the tire is mounted on a specified rim, inflated to the specified internal pressure, and is in an unloaded state.

In the configuration of FIG. 1, the belt layer 14 has a structure with left-right symmetry centered on the tire equatorial plane CL as illustrated in FIG. 3, and the width Wb1 of the large-angle belt 141 and the width Wb3 of the narrower cross belt 143 have a relationship such that Wb1≤Wb3. As a result, an edge portion of the large-angle belt 141 is disposed inward in the tire width direction from the edge portion of the narrower cross belt 143 in a region on either side of the tire equatorial plane CL. However, the configuration is not limited thereto, and the width Wb1 of the large-angle belt 141 and the width Wb3 of the narrower cross belt 143 may have a relationship such that Wb1≥Wb3 (not illustrated).

Also, preferably, the belt cords of the large-angle belt 141 are steel wires, and the number of ends in the large-angle belt is not less than 15 ends/50 mm and not more than 25 ends/50 mm. Moreover, the belt cords of the pair of cross belts 142, 143 are preferably steel wire, and the number of ends in the pair of cross belts 142, 143 preferably is not less than 18 ends/50 mm and not more than 28 ends/50 mm, and more preferably is not less than 20 ends/50 mm and not more than 25 ends/50 mm. Also, the belt cords of the circumferential reinforcing layer 145 are steel wire, and the number of ends in the circumferential reinforcing layer 145 preferably is not less than 17 ends/50 mm and not more than 30 ends/50 mm. Thereby, the suitable strengths of the belt plies 141, 142, 143, 145 are ensured.

Furthermore, a modulus E1 at 100% elongation of the coating rubber of the large-angle belt 141 and a modulus Es at 100% elongation of the coating rubber of the circumferential reinforcing layer 145 preferably have a relationship such that 0.90≤Es/E1≤1.10. Additionally, moduli E2, E3 at 100% elongation of the coating rubbers of the pair of cross belts 142, 143, and the modulus Es at 100% elongation of the coating rubber of the circumferential reinforcing layer 145 preferably have a relationship of 0.90≤Es/E2≤1.10 and 0.90≤Es/E3≤1.10. Additionally, the modulus Es at 100% elongation of the coating rubber of the circumferential reinforcing layer 145 is preferably within the range of 4.5 MPa≤Es≤7.5 MPa. Thereby, the moduli of the belt plies 141, 142, 143, 145 are made appropriate.

The modulus at 100% elongation is measured by performing a tensile test at ambient temperature in conformity with JIS-K6251 (using dumbbell no. 3).

Furthermore, a breaking elongation λ1 of the coating rubber of the large-angle belt 141 is preferably not less than 200%. Moreover, breaking elongations λ2, λ3 of the coating rubbers of the pair of cross belts 142, 143 are preferably not less than 200%. Furthermore, a breaking elongation λs of the coating rubber of the circumferential reinforcing layer 145 is preferably not less than 200%. Thereby, the suitable durability of the belt plies 141, 142, 143, 145 is ensured.

Breaking elongation is measured by performing a tensile test conforming to JIS-K7161 on a test sample of the JIS-K7162 specification 1B shape (dumb bell shape with a thickness of 3 mm) using a tensile tester (INSTRON5585H manufactured by Instron Corp.) at a pulling speed of 2 mm/min.

Elongation of the belt cords, as components, which constitute the circumferential reinforcing layer 145 is preferably not less than 1.0% and not greater than 2.5% when the tensile load is from 100 N to 300 N, and elongation of the belt cords, as a cured tire component (when removed from the tire), is preferably not less than 0.5% and not greater than 2.0% when the tensile load is from 500 N to 1000 N. Such belt cords (high elongation steel wire) have a good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is preferable.

The elongation of the belt cords is measured in accordance with JIS-G3510.

Additionally, in the pneumatic tire 1, the breaking elongation of the tread rubber 15 is preferably not less than 350%. Thereby, the strength of the tread rubber 15 is assured, as to suppress the occurrence of tears in the outermost circumferential main groove 2. Furthermore, the maximum breaking elongation of the tread rubber 15 is not specifically limited, but is constrained by the type of rubber compound of the tread rubber 15.

Additionally, in this pneumatic tire 1, the hardness of the tread rubber 15 preferably is not less than 60. Thereby, a suitable strength of the tread rubber 15 is ensured. Furthermore, the maximum hardness of the tread rubber 15 is not specifically limited, but is constrained by the type of rubber compound of the tread rubber 15.

Here, the term rubber hardness refers to JIS-A hardness in accordance with JIS-K6263.

Furthermore, in the pneumatic tire 1, a loss tangent tan δ of the tread rubber 15 is preferably not less than 0.10.

The loss tangent tan δ is measured by using a viscoelastic spectrometer under conditions of a temperature of 20° C., a shearing strain of 10%, and a frequency of 20 Hz.

Belt Edge Cushion

In the configuration illustrated in FIGS. 1 and 2, the circumferential reinforcing layer 145 is disposed inward in the tire width direction from the left and right edge portions of the narrower cross belt 143 of the pair of cross belts 142, 143. Additionally, the belt edge cushion 19 is disposed interposed between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction, is adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

Additionally, in the configuration illustrated in FIG. 1, the belt edge cushion 19 has a structure that is thicker as a whole than the circumferential reinforcing layer 145 due to the thickness increasing toward the outer side in the tire width direction. Additionally, the belt edge cushion 19 has a modulus E at 100% elongation that is lower than that of the coating rubber of the cross belts 142, 143. Specifically, the modulus E at 100% elongation of the belt edge cushion 19 and a modulus Eco of the coating rubber have a relationship satisfying $0.60 \leq E/Eco \leq 0.95$. The modulus E at 100% elongation of the belt edge cushion 19 is within a range of 4.0 $MPa \leq E \leq 5.5$ MPa. As a result, the occurrence of separation of rubber material between the pair of cross belts 142, 143 and in a region on the outer side of the circumferential reinforcing layer 145 in the tire width direction is suppressed.

Effect

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIGS. 1 and 2). Also, the belt layer 14 includes the circumferential reinforcing layer 145 having a belt angle within the range ±5° with respect to the tire circumferential direction, and the inner-side belt ply (in FIG. 2, the inner-side cross belt 142) and the outer-side belt ply (in FIG. 2, the outer-side cross belt 143) having a belt angle, as an absolute value, of not less than 10° and not more than 70°, and laminated adjacent to the circumferential reinforcing layer 145 on the inner side in the tire radial direction and the outer side in the tire radial direction of the circumferential reinforcing layer 145 respectively. Also, the inter-cord distance Gcl between the circumferential reinforcing layer 145 and the inner-side belt ply 142 at the tire equatorial plane CL, the inter-cord distance Gcu between the circumferential reinforcing layer 145 and the outer-side belt ply 143 at the tire equatorial plane CL, the inter-cord distance Gsl between the circumferential reinforcing layer 145 and the inner-side belt ply 142 at the end regions of the circumferential reinforcing layer 145, and the inter-cord distance Gsu between the circumferential reinforcing layer 145 and the outer-side belt ply 143 at the end regions of the circumferential reinforcing layer 145 have the relationship $1.20 \leq (Gcl+Gcu)/(Gsl+Gsu) \leq 9.20$ (see FIGS. 4 and 5).

In this configuration, the sum of the inter-cord distances (Gcl+Gcu) on the inside and outside of the circumferential reinforcing layer 145 at the tire equatorial plane CL is set larger than the sum of the inter-cord distances (Gsl+Gsu) on the inside and outside of the circumferential reinforcing layer 145 at the end regions of the circumferential reinforcing layer 145. Therefore, the shear stress acting between the belt plies 142, 143, 145 when the tire is rolling is relatively smaller at the tire equatorial plane CL, and is relatively larger at the end regions of the circumferential reinforcing layer 145. As a result, the difference in radial growth of the tread portion between the center region and the end regions of the circumferential reinforcing layer 145 becomes uniform, which has the advantage that the uniformity of radial growth in the tire is improved. In other words, because $1.20 \leq (Gcl+Gcu)/(Gsl+Gsu)$, the radial growth in the shoulder region of the tread portion is effectively reduced, and because $(Gcl+Gcu)/(Gsl+Gsu) \leq 9.20$, the radial growth in the center region of the tread portion is effectively reduced.

Moreover, in the pneumatic tire 1, the width Ws of the circumferential reinforcing layer 145 and the cross-sectional width Wca of the carcass layer 13 have a relationship such that $0.60 \leq Ws/Wca \leq 0.70$ (see FIG. 1). As a result, there is an advantage that the ratio Ws/Wca between the width Ws of the circumferential reinforcing layer 145 and the width Wca of the carcass layer 13 is made appropriate. In other words, as a result of having the relationship of $0.60 \leq Ws/Wca$, the function of the circumferential reinforcing layer 145 in reducing the tire radial growth (hoop effect) is properly ensured. Furthermore, as a result of having the relationship of $Ws/Wca \leq 0.70$, fatigue failure of the belt cords at the edge portion of the circumferential reinforcing layer 145 is suppressed.

Also, in the pneumatic tire 1, the inter-cord distances Gcl, Gcu, Gsl, Gsu are each not less than 0.10 mm. In this configuration, the inter-cord distances Gcl, Gcu, Gsl, Gsu are properly ensured, and the strain in the rubber material between the belt plies 142, 143, 145 is reduced. Thus, such a configuration is advantageous in that the tire durability is improved.

Additionally, in this pneumatic tire 1, the cross-sectional width Wca of the carcass layer 13 and the width Wb2 of the inner-side belt ply 142 have a relationship such that $0.74 \leq Wb2/Wca \leq 0.89$ (see FIG. 1). As a result, there is an advantage that the width Wb2 of the inner-side belt ply 142 is made appropriate and the tire durability is improved.

Also, in the pneumatic tire 1, the width Wb3 of the outer-side belt ply 143 and the width Ws of the circumferential reinforcing layer 145 have a relationship such that $0.75 \leq Ws/Wb3 \leq 0.90$. This has the advantage that the width Ws of the circumferential reinforcing layer 145 is made appropriate, and the durability of the tire is improved.

Also, in the pneumatic tire 1, the inner-side belt ply and the outer-side belt ply each have a belt angle, as an absolute value, of not less than 15° and not more than 60°. This leads to the advantage that the belt angle of the belt plies adjacent to the circumferential reinforcing layer is made appropriate, and the tire durability and steering stability are improved.

Moreover, in the pneumatic tire 1, the diameters of the belt cords 1451, 1421, 1431 of the respective circumferential reinforcing layer 145, the inner-side belt ply 142, and the outer-side belt ply 143 are each within the range of not less than 1.20 mm and not more than 2.20 mm. As a result, the difference in stiffness between the belt plies 145, 142, and 143 can be reduced, which has the advantage that the tire durability is increased.

Also, in the pneumatic tire 1, the number of ends of the belt cords 1451, 1421, 1431 in the respective circumferential reinforcing layer 145, the inner-side belt ply 142, and the outer-side belt ply 143 is within the range of not less than 18 ends per 50 mm and not more than 28 end per 50 mm. As a result, the difference in stiffness between the belt plies 145, 142, and 143 can be reduced, which has the advantage that the tire durability is increased.

Also, in the pneumatic tire 1, the inter-cord distances Gcl, Gcu, Gsl, Gsu have the relationships $Gsl < Gcl$ and $Gsu < Gcu$. In this configuration, both the inter-cord distances Gcl, Gsl between the circumferential reinforcing layer 145 and the inner-side belt ply 142 and the inter-cord distances Gcu, Gsu between the circumferential reinforcing layer 145 and the outer-side belt ply 143 have a gauge difference between the tire equatorial plane CL and the end regions of the circumferential reinforcing layer 145, which has the advantage that the difference in radial growth of the tread portion between the center region and the end regions of the circumferential reinforcing layer 145 is effectively made uniform.

Also, in the pneumatic tire 1, the sum (Gsl+Gsu) of the inter-cord distances Gsl, Gsu monotonically becomes less (constant or reduces) towards the outer side in the tire width direction at the end regions of the circumferential reinforcing layer 145 (see FIG. 2). As a result, the shear stress acting between the belt plies 142, 143, 145 at the end regions of the circumferential reinforcing layer 145 is comparatively large, which has the advantage that the radial growth at the shoulder regions of the tread portion is effectively reduced.

Furthermore, in the pneumatic tire 1, the inner-side belt ply 142 and the outer-side belt ply 143 are cross belts having a belt angle, as an absolute value, of not less than 10° and not more than 45°, and belt angles having mutually opposite signs (see FIG. 3). Thus, such a configuration is advantageous in that the tire durability is improved.

Furthermore, in the pneumatic tire 1, the tread width TW and the total tire width SW have a relationship such that 0.79≤TW/SW≤0.89 (see FIG. 1). In this configuration, radial growth of the left and right shoulder portions is reduced by having the ratio TW/SW within the above range. Consequently, a difference in radial growth between the center region and the shoulder region is alleviated and the ground contact pressure distribution is made uniform. This has the advantage that the uneven wear resistance of the tire is increased. Specifically, an average ground contact pressure is reduced due to the ratio TW/SW being equal to or greater than 0.79. Moreover, rising of the shoulder portion is suppressed and deflection when the tire makes ground contact is suppressed due to the ratio TW/SW being less than or equal to 0.89.

Additionally, in this pneumatic tire 1, the tread width TW and a cross-sectional width Wca of the carcass layer 13 have a relationship such that 0.82≤TW/Wca≤0.92 (see FIG. 1). In this configuration, radial growth in the center region is suppressed due to the belt layer 14 having the circumferential reinforcing layer 145. Furthermore, since the ratio TW/Wca is within the above-described range, a difference in radial growth between the center region and the shoulder regions is alleviated and the ground contact pressure distribution in the tire width direction is made uniform. Thereby, the ground contact pressure distribution of the tire is advantageously made uniform. Specifically, satisfying the relationship such that 0.82≤TW/Wca ensures the air volume inside the tire and suppresses deflection. Moreover, satisfying the relationship such that TW/Wca≤0.92 suppresses rising of the shoulder portion, which in turn makes the ground contact pressure distribution uniform.

EXAMPLE

FIGS. 6A-6B and 7A-7B are tables showing the results of performance testing of pneumatic tires according to the embodiments of the present technology.

In the performance testing, a plurality of mutually differing test tires were evaluated for (1) uniformity of radial growth and (2) durability. During the evaluation, the test tires with a size of 315/60R22.5 were mounted on a 22.5"×9.00" rim.

(1) In the evaluation of uniformity of radial growth, the amount of change in the external diameter of the center region and the amount of change in the external diameter of the shoulder regions of the tread portion were measured when the internal pressure of the test tire was increased from 100 kPa to 900 kPa. Then the ratio (amount of change in the external diameter of the shoulder region/amount of change in the external diameter of the center region) was measured, and index evaluation was carried out. In this evaluation, an index value in the range of not less than 95 and not more than 105 indicates that the uniformity of radial growth of the tire is properly ensured.

(2) In the evaluation of the durability, the test tires were inflated to an inner pressure of 900 kPa. Further, a low pressure endurance test was performed using an indoor drum tester. Then, a running speed was set to 45 km/h, the load was increased from a load of 34.81 kN by 5% (1.74 kN) every 12 hours, and the running distance until the tire failed was measured. Then, based on the measurement results, index evaluation was performed taking a Conventional Example as a reference (100). With this evaluation, larger numerical values are preferable.

The structure of the test tires according to Working Examples 1 to 15 is illustrated in FIG. 1 through FIG. 5. In the case of the test tire of the Conventional Example, in the configuration of FIGS. 1 to 5, the intermediate rubber 201, 202 between the pair of cross belts 142, 143 and the circumferential reinforcing layer 145 was omitted, and the inter-cord distances Gcl, Gcu, Gsl, Gsu have the relationships (Gcl+Gcu)/(Gsl+Gsu)=1.00, and Gcl=Gsl and Gcu=Gsu.

As shown in the test results, it can be seen that the tire uniformity of radial growth is appropriately ensured, and, the belt durability of the tire is improved in the test tires of Working Examples 1 to 15.

What is claimed is:

1. A pneumatic tire comprising:

a carcass layer;

a belt layer disposed on an outer side in a tire radial direction of the carcass layer; and a tread rubber disposed on an outer side in the tire radial direction of the belt layer, the belt layer including a circumferential reinforcing layer having a belt angle within a range of ±5° with respect to a tire circumferential direction, and an inner-side belt ply and an outer-side belt ply having a belt angle, as an absolute value, of not less than 10° and not more than 70°, laminated adjacent to the circumferential reinforcing layer on an inner side in the tire radial direction and an outer side in the tire radial direction of the circumferential reinforcing layer respectively;

an inter-cord distance Gcl between the circumferential reinforcing layer and the inner-side belt ply at a tire equatorial plane, an inter-cord distance Gcu between the circumferential reinforcing layer and the outer-side belt ply at the tire equatorial plane, an inter-cord distance Gsl between the circumferential reinforcing layer and the inner-side belt ply at end regions of the circumferential reinforcing layer, and an inter-cord distance Gsu between the circumferential reinforcing layer and the outer-side belt ply at the end regions of the circumferential reinforcing layer having a relationship such that 1.20≤(Gcl+Gcu)/(Gsl+Gsu)≤9.20;

an end region of the circumferential reinforcing layer referring to a region from an end on an outer side in a tire width direction of the circumferential reinforcing layer to a position 20% of a width Ws of the circumferential reinforcing layer from the end; and the inter-cord distances Gcl, Gcu, Gsl, Gsu having a relationship such that Gsl<Gcl and Gsu<Gcu.

2. The pneumatic tire according to claim 1, wherein a width Ws of the circumferential reinforcing layer and a cross-sectional width Wca of the carcass layer have a relationship such that 0.60≤Ws/Wca≤0.70.

3. The pneumatic tire according to claim 1, wherein the inter-cord distances Gcl, Gcu, Gsl, Gsu are each not less than 0.10 mm.

4. The pneumatic tire according to claim 1, wherein the cross-sectional width Wca of the carcass layer and a width Wb2 of the inner-side belt ply have a relationship such that $0.74 \leq Wb2/Wca \leq 0.89$.

5. The pneumatic tire according to claim 1, wherein a width Wb3 of the outer-side belt ply and the width Ws of the circumferential reinforcing layer have a relationship such that $0.75 \leq Ws/Wb3 \leq 0.90$.

6. The pneumatic tire according to claim 1, wherein the inner-side belt ply and the outer-side belt ply have a belt angle, as an absolute value, of not less than 15° and not greater than 60°.

7. The pneumatic tire according to claim 1, wherein a diameter of belt cords of the circumferential reinforcing layer, the inner-side belt ply, and the outer-side belt ply is within a range of not less than 1.20 mm and not more than 2.20 mm.

8. The pneumatic tire according to claim 1, wherein a number of ends of the belt cords in the circumferential reinforcing layer, the inner-side belt ply, and the outer-side belt ply is in a range from not less than 18 ends per 50 mm to not more than 28 ends per 50 mm.

9. The pneumatic tire according to claim 1, wherein a sum (Gsl+Gsu) of the inter-cord distances Gsl, Gsu monotonically becomes less towards the outer side in a tire width direction at the end regions of the circumferential reinforcing layer.

10. The pneumatic tire according to claim 1, wherein the inner-side belt ply and the outer-side belt ply are cross belts having a belt angle, as an absolute value, of not less than 10° and not greater than 45°, and having belt angles with mutually opposite signs.

11. The pneumatic tire according to claim 1, wherein a tread width TW and a total tire width SW have a relationship such that $0.79 \leq TW/SW \leq 0.89$.

12. The pneumatic tire according to claim 1, wherein the tread width TW and the cross-sectional width Wca of the carcass layer have a relationship such that $0.82 \leq TW/Wca \leq 0.92$.

13. The pneumatic tire according to claim 1, wherein the inner-side belt ply and the outer-side belt ply have the belt angle, as an absolute value, of not less than 50° and not more than 70°.

* * * * *